March 5, 1957   F. J. KENLINE   2,783,836
SPEED INDICATING APPARATUS FOR MOVING BODIES
Filed May 25, 1955
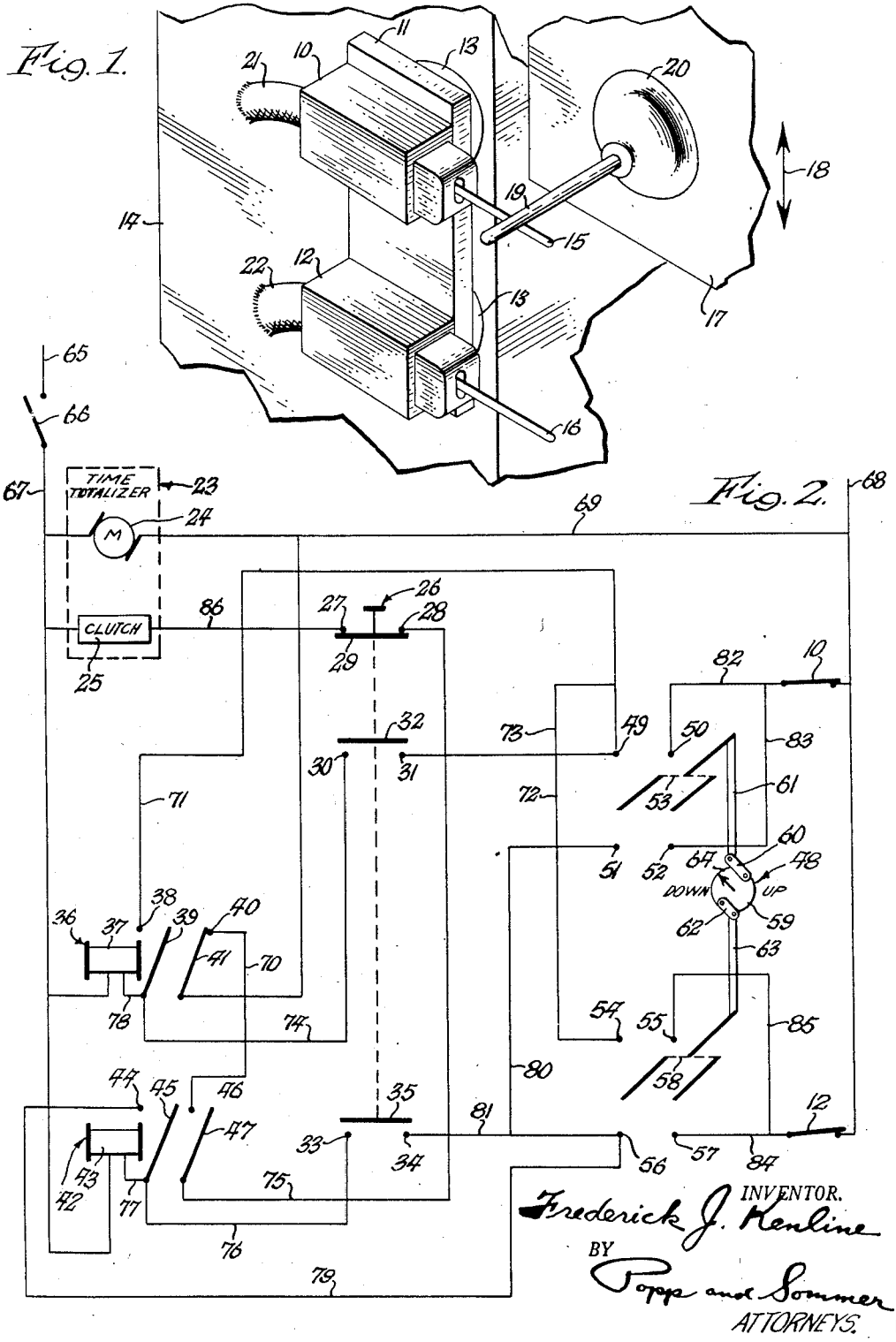

United States Patent Office 2,783,836
Patented Mar. 5, 1957

2,783,836

SPEED INDICATING APPARATUS FOR MOVING BODIES

Frederick J. Kenline, Buffalo, N. Y.

Application May 25, 1955, Serial No. 510,904

4 Claims. (Cl. 161—18)

This invention relates to measuring instruments and more particularly to an apparatus for indicating the speed of a moving body in a selected direction.

Heretofore, numerous speed indicating devices have been developed and utilized and the more accurate of such devices have involved the use of photo-electric timing devices or relatively complicated electronic circuits which has resulted in extremely costly indicating instruments and which has failed to provide speed indicating instruments where less accuracy is required and at a reasonable cost.

It is often desirable, and in some cases necessary to have a reasonably accurate indication of the speed of movement of the plunger of a die-casting machine or the plunger of an extrusion press and it is also, frequently desirable to know the speed of movement of the ram of various types of presses. It is also frequently desirable, to have a reasonably accurate indication of the speed of reciprocating or other moving bodies and a simple, accurate and easily operated apparatus for this purpose, represents an item of equipment having widespread and valuable uses.

Heretofore, in determining the speed of reciprocation of a plunger for a die-casting machine, or the ram of an extrusion press, it has been common practice to provide spaced indicating lines on a fixed portion of the machine and a line on the plunger or ram and to utilize a stopwatch for timing the interval required for the line on the plunger or ram to move betwen the fixed lines on the machine. This movement was timed for a certain number of operations, such as eighteen, and then an average taken to determine the speed of movement of the plunger or ram. Obviously, this method requires a relatively high degree of skill on the part of the person timing the apparatus and furthermore, a reasonably long period of time is required for this operation. Consequently, an apparatus which would indicate immediately a reasonably accurate indication of the speed of movement of the plunger or ram, would materially reduce operating costs. This apparatus should, moreover, be one which may easily be operated by the normal operator of the machine without requiring specially trained or highly skilled personnel to obtain the desired information as to speed of operation of the plunger or ram of the machine.

In addition to being extremely costly, the above mentioned photo-electric and electronic timers, in general, require an appreciable warm-up period before they are ready for operation and they are, furthermore, relatively delicate, requiring protection against shock and the like, all of which materially contributes to increased cost of operation with consequent higher production costs.

It is therefore, an object of this invention to provide a relatively simple, inexpensive, yet accurate speed indicating apparatus involving the use of manually operated switches, limit switches, relays and an elapsed time measuring device driven by a synchronous motor.

A further object of the invention is the provision of a speed indicating apparatus requiring no warm-up time and which may be quickly and conveniently attached to existing machines to indicate the speed of motion of a part thereof in a selected direction.

A still further object of the invention is the provision of a speed indicating apparatus for moving bodies, which may be conveniently operated by relatively unskilled personnel, simply by depressing and releasing a push button thereby initiating a timing cycle which is thereafter entirely automatic.

Another object of the invention is the provision of a speed indicating apparatus for moving bodies in which the speed of movement of a body in either of two directions may be manually selected and the speed of such movement automatically determined with the required degree of accuracy.

Another object of the invention is the provision of a speed indicating apparatus for moving bodies in which the accuracy of such apparatus is totally independent of the operator.

A still further object of the invention is the provision of a speed indicating apparatus for moving bodies which may be of relatively rugged construction and not requiring the use of relatively fragile electronic components, such as vacuum tubes, photo-electric cells and the associated relatively complicated circuits.

Further objects and advantages of the invention will be apparent from the following description taken in conjunction with the accompanying drawing wherein:

Fig. 1 is a fragmentary view in perspective showing the limit switches for actuating the timing apparatus of this invention applied to a machine and a limit switch operating finger applied to a moving body on such machine, the speed of which is to be determined by the speed indicating apparatus of this invention; and Fig. 2 is a schematic circuit diagram of the speed indicating apparatus of this invention.

With continued reference to the drawing, the speed indicating apparatus of this invention may well comprise a limit switch 10 mounted on a base 11 and a second limit switch 12 mounted on the base 11 at a predetermined distance from the limit switch 10. The base 11 may be provided with permanent magnets 13 or any other suitable means, to detachably mount the base 11 on a fixed frame or other part 14 of a machine, such as a die-casting apparatus, an extrusion press, or any other machine in which it is desired to measure the speed of movement of a part thereof. The limit switch 10 may be provided with an actuating arm 15 and the limit switch 12 with an actuating arm 16.

A moving body 17, such as the plunger of a die-casting machine, or the ram of an extrusion press or any other movable body, such as a reciprocating member movable in two directions as indicated by the arrow 18 in Fig. 1, may serve to receive an actuating finger 19 which may be mounted on the body 17 by a permanent magnet 20 or other suitable means, and the finger 19 is so positioned as to contact the arms 15 and 16 during normal movement in either direction of the body 17. The limit switches 10 and 12 may be provided with electrical cables 21 and 22 respectively, which lead to the remainder of the indicating apparatus which may be housed in a suitable container and located at any convenient remote point.

With particular reference to Fig. 2, there is shown an elapsed time measuring device 23 which may well include a synchronous motor 24 which runs continuously during the operation of the apparatus and an electrically controlled clutch 25 which may be operated to connect the motor 24 with an indicating hand or dial which may serve to indicate the time of operation of the indicator 23, or may be calibrated in any desired units to indicate the speed of movement of the moving body 17. The indicating apparatus of this invention, as shown in Fig.

2, also include a manually operable push button starting switch 26 having a pair of normally closed contacts 27 and 28, which are closed by shorting bar 29, a pair of normally open contacts 30 and 31 which may be closed by a shorting bar 32 and a second pair of normally open contacts 33 and 34 which may be closed by a shorting bar 35. There is also provided an electro-magnetically operated relay 36 having an actuating coil 37, a fixed contact 38 and a cooperating normally open, movable contact 39, as well as a fixed contact 40 and a normally closed, cooperating movable contact 41.

A second electro-magnetically operated relay 42 is provided with an actuating coil 43, a fixed contact 44 and a cooperating normally open movable contact 45, as well as a fixed contact 46 and a cooperating, normally open movable contact 47.

The timing apparatus also includes a two position selector switch 48 having a pair of contacts 49 and 50, a second pair of contacts 51 and 52 and a shorting bar 53 which may selectively close either the contacts 49 and 50 or the contacts 51 and 52. The selector switch 48 also includes a pair of contacts 54 and 55 and a pair of contacts 56 and 57 which may be selectively closed by a shorting bar 58.

For purposes of illustration only, there is shown an operating mechanism for the shorting bars 53 and 58 which may comprise a crank plate 59 operated by a suitable finger engaging control knob, not shown, there being a link 60 pivotally connected to the plate 59 and to a link 61 which in turn is connected to the shorting bar 53. Another link 62 may be pivotally connected to the shorting bar 58. Consequently, as seen from an inspection of Fig. 2, movement of the crank plate 59 to a position where the arrow 64 points to the down position, will operate to engage the shorting bar 53 with the contacts 49 and 50 to close the same and to engage the shorting bar 58 with the contacts 56 and 57 to close these contacts. Movement of the crank plate 59 to a position where the arrow 64 points to the up position will result in moving the shorting bar 53 into engagement with the contacts 51 and 52 to close the same and movement of the shorting bar 58 into engagement with the contacts 54 and 55 to close these contacts.

As shown in Fig. 2, there may be provided a source of electrical energy comprising a conductor 65 in which is connected a main control switch 66 and from which a conductor 67 connects to the motor 24, the clutch 25, the coil 37 of the relay 36 and to the coil 43 of the relay 42. The electrical energy source may also include a conductor 68 which connects to the limit switch 10 and to the limit switch 12, as well as through a conductor 69 to the motor 24 and to the normally closed movable contact 41 of the relay 36. The normally closed fixed contact 40 of the relay 36 is connected through a conductor 70 with the fixed contact 46 of the relay 42. The normally open fixed contact 38 of the relay 36 is connected through a conductor 71 with the contact 49 of the selector switch 48, as well as through a conductor 72 with the contact 54 of the selector switch 48 and through a conductor 73 with the normally open contact 31 of the push button switch 26. The movable contact 39 of the relay 36 is connected through a conductor 74 with the normally open contact 30 of the push button switch 26.

The movable contact 47 of the relay 42 is connected through a conductor 75 with the normally closed contact 28 of the push button switch 26 and the movable contact 45 of the relay 42 is connected through a conductor 76 with the normally open contact 33 of the push button switch 26. The movable contact 45 of the relay 42 is also connected through a conductor 77 with the coil 43 of the relay 42 and the movable contact 39 of the relay 36 is connected through a conductor 78 with the coil 37 of the relay 36. The fixed contact 44 of the relay 42 is connected through a conductor 79 with the contact 56 of the selector switch 48 and through a conductor 80 with the contact 51 of the selector switch 48, as well as through a conductor 81 with the normally open contact 34 of the push button switch 26. The limit switch 10 is connected through a conductor 82 with the contact 50 of the selector switch 48 and through a conductor 83 with the contact 52 of the selector switch 48. The limit switch 12 is connected through a conductor 84 with the contact 57 of the selector switch 48 and through a conductor 85 with the contact 55 of the selector switch 48. The closed contact 27 of the push button switch 26 is connected through a conductor 86 with the clutch 25 of the elapsed time indicator 23.

The operation of the speed indicating apparatus of this invention is as follows: Assuming that the main control switch 66 is closed which results in energizing the synchronous motor 24 and causing the same to operate and further assuming, that it is desired to measure the speed of movement of the body 17 in a downwardly direction, as shown, or between the limit switches 10 and 12, the selector switch 48 will be manipulated to move the arrow 64 to the down position, thereby bringing the shorting bar 53 into engagement with contacts 49 and 50 and the shorting bar 58 into engagement with the contacts 56 and 57 of the selector switch 48. The timing cycle is initiated by pressing the push button switch 26 which operates to open the normally closed contacts 27 and 28 and to close the normally open contacts 30 and 31 thereby energizing the coil 37 of relay 36 and closing the contacts 38 and 39 and opening the contacts 40 and 41 of the relay 36. Depressing of the push button switch 26 also operates to close the normally open contacts 33 and 34 which results in energizing the coil 43 of relay 42 thereby closing the contacts 44 and 45, as well as the contacts 46 and 47. Releasing of the push button switch 26 results in closing the normally closed contacts 27 and 28 and in opening the normally open contacts 30 and 31, as well as the contacts 33 and 34.

Downward movement of the body 17 and finger 19 results in contact of such finger with the arm 15 on the limit switch 10 thereby opening a normally closed contact of the limit switch 10 and de-energizing the coil 37 of the relay 36 thereby opening the contacts 38 and 39 and closing the contacts 40 and 41 which results in energizing the clutch 25 thereby starting operation of the elapsed time indicator.

Further downward movement of the body 17 will result in contact of the finger 19 with the arm 16 thereby opening the limit switch 12 and de-energizing the coil 43 of the relay 42 which results in opening the contacts 44 and 45 as well as contacts 46 and 47 of this relay thereby de-energizing clutch 25 and stopping operation of the elapsed time indicator 23. Since the distance between the limit switches 10 and 12 is known, the same may be utilized in conjunction with the elapsed time shown on the indicator to calculate the speed of movement of the body 17 between the limit switches 10 and 12, or, as mentioned above, the elapsed time indicator 23 may be directly calibrated to indicate such speed of movement.

The indicating apparatus of this invention may be also utilized to indicate the speed of movement of body 17 in the opposite direction and for this purpose, the selector switch 48 is moved to bring the arrow 64 into registry with the up position, at which time the shorting bar 53 will close the contacts 51 and 52 of the selector switch 48 and the shorting bar 58 will close the contacts 54 and 55 of the selector switch 48. In this instance, the finger 19 on the body 17 will first contact the arm 16 to open a normally closed contact of the limit switch 12 and will next contact the arm 15 to open the limit switch 10. The operation of the indicating apparatus in this direction of movement of the body 17 is identical with that described above, and it is to be noted that starting and stopping of the elapsed time indicator 23 is controlled entirely by de-energization of the relays 36 and 42 which provide a more accurate time measurement than would be the case if operation of the elapsed time indicator were controlled by energization of such relays.

Obviously, at all times, while the main switch 66 is closed the motor 24 is operating and the apparatus is in condition to initiate a timing cycle. Since there are no vacuum tubes or similar electronic components employed, obviously no warm up time is required and it is only necessary to depress the starting button 26 in order to initiate operation of the timing cycle. Likewise, the speed of operation in either of two directions may conveniently be determined by proper operation of the selector switch 48 and once this selector switch has been set and the push button switch 26 depressed and released, the resulting timing cycle is completely automatic in operation.

Since the elapsed time indicator 23 is dependent for accuracy on the frequency of the source of electrical energy and since such source is normally controlled within extremely close limits, obviously, the apparatus of this invention is relatively accurate and at the same time, relatively inexpensive due to the elimination of costly electronic components, as well as the associated complicated circuits. The elapsed time indicator as well as the relays and switches are commonly available commercial items and consequently, the apparatus of this invention provides a timing device which may be economically constructed and utilized where extreme accuracy is not required.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A speed indicating apparatus for a moving body, said apparatus comprising an elapsed time measuring device driven by a continuously running synchronous motor, an electrically controlled clutch for connecting and disconnecting said time measuring device to and from said motor, a relay having an actuating coil, two fixed contacts and two movable contacts cooperating therewith, one fixed contact and one movable contact being normally open, the other fixed contact and movable contact being normally closed, a second relay having an actuating coil, two fixed contacts and two movable contacts cooperating therewith, both of said last named fixed and movable contacts being normally open, a push button starting switch having a pair of normally closed contacts and two pairs of normally open contacts, a two position selector switch, a limit switch having a set of normally closed contacts, a second limit switch having a set of normally closed contacts, said second switch being spaced a predetermined distance from said first limit switch and means attachable to said moving body to open said limit switches in succession, an electrical energy supply line having one conductor connected to said motor, said clutch and the coils of said relays and another conductor connected to said motor, the normally closed movable contact of said first relay and said first and second limit switches, said clutch being connected to one of the pair of normally closed contacts on said push button switch and the other contact of said pair being connected to one movable contact of said second relay, the cooperating fixed contact of said second relay being connected to the normally closed fixed contact of said first relay, the normally open movable contact of said first relay being connected to the coil of said first relay and to one of a pair of normally open contacts on said push button switch and the other contact of said last named pair being connected to said selector switch and to the normally open fixed contact of said first relay, the other movable contact of said second relay being connected to the coil of said second relay and to one of the other pair of normally open contacts on said push button switch and the other contact of said last named pair being connected to said selector switch and to the other fixed contact of said second relay and said first and second limit switches being connected to said selector switch whereby with said selector switch in one position and said body moving in a direction from said first to said second limit switches, upon actuating said push button switch to open said pair of normally closed contacts and close said pairs of normally open contacts the coils of said first and second relays will be energized to close the normally open contacts and open the normally closed contacts of said first relay and close the normally open contacts of said second relay and upon release of said push button switch said pair of normally closed contacts will be closed and said pairs of normally open contacts will be opened, movement of said body serving to open said first limit switch to de-energize said first relay and actuate said clutch to start said time measuring device, further movement of said body serving to open said second limit switch to de-energize said second relay and actuate said clutch to stop said time measuring device thereby indicating the time required for said body to move from said first limit switch to said second limit switch, speed of movement of said body in the other direction being determined by setting said selector switch in the other position and repeating the cycle of operation.

2. A speed indicating apparatus for a moving body, said apparatus comprising an elapsed time measuring device, electrical means for starting and stopping said time measuring device, a relay having an actuating coil, two fixed contacts and two movable contacts cooperating therewith, one fixed contact and one movable contact being normally open, the other fixed contact and movable contact being normally closed, a second relay having an actuating coil, two fixed contacts and two movable contacts cooperating therewith, both of said last named fixed and movable contacts being normally open, a push button starting switch having a pair of normally closed contacts and two pairs of normally open contacts, a two position selector switch, a limit switch having a set of normally closed contacts, a second limit switch having a set of normally closed contacts, said second switch being spaced a predetermined distance from said first limit switch and means attachable to said moving body to open said limit switches in succession, an electrical energy supply line having one conductor connected to said time measuring device, said electrical means and the coils of said relays and another conductor connected to said time measuring device, the normally closed movable contact of said first relay and said first and second limit switches, said electrical means being connected to one of a pair of normally closed contacts on said push button switch and the other contact of said pair being connected to one movable contact of said second relay, the cooperating fixed contact of said second relay being connected to the normally closed fixed contact of said first relay, the normally open movable contact of said first relay being connected to the coil of said first relay and to one of a pair of normally open contacts on said push button switch and the other contact of said last named pair being connected to said selector switch and to the normally open fixed contact of said first relay, the other movable contact of said second relay being connected to the coil of said second relay and to one of the other pair of normally open contacts on said push button switch and the other contact of said last named pair being connected to said selector switch and to the other fixed contact of said second relay and said first and second limit switches being connected to said selector switch whereby with said selector switch in one position and said body moving in a direction from said first to said second limit switches, upon actuating said push button switch to open said pair of normally closed contacts and close said pairs of normally open contacts, the coils of said first and second relays will be energized to close the normally open contacts and open the normally closed contacts of said first relay and close the normally open contacts of said second relay and upon release of said push button switch said pair of normally closed contacts will be closed and said pairs of normally open contacts will be opened, movement of said body serving to open said first limit switch to de-energize said first relay and actuate said electrical means to start said time measuring device, further movement of said body serving to open said second limit switch to de-energize said second relay and actuate said electrical means to stop said time measuring device thereby indicating the time required for said body to move from said first limit switch to said second limit switch.

3. A speed indicating apparatus for a moving body, said apparatus comprising an elapsed time measuring device, electrical means for starting and stopping said time measuring device, a relay having an actuating coil, two fixed contacts and two movable contacts cooperating therewith, one fixed contact and one movable contact being normally open, the other fixed contact and movable contact being normally closed, a second relay having an actuating coil, two fixed contacts and two movable contacts cooperating therewith, both of said last named fixed and movable contacts being normally open, a push button starting switch having a pair of normally closed contacts and two pairs of normally open contacts, a two position selector switch, a limit switch having a set of normally closed contacts, a second limit switch having a set of normally closed contacts, said second switch being spaced a predetermined distance from said first limit switch and means attachable to said moving body to open said limit switches in succession, an electrical energy supply line and conductors interconnecting said electrical means, said first and second relays, said selector switch, said first and second limit switches and said supply line whereby with said selector switch in one position and said body moving in a direction from said first to said second limit switches, upon actuating said push button switch to open said pair of normally closed contacts and close said pairs of said normally opened contacts, the coils of said first and second relays will be energized to close the normally open contacts and open the normally closed contacts of said first relay and close the normally open contacts of said second relay and upon release of said push button switch said pair of normally closed contacts will be closed and said pairs of normally opened contacts will be open, movement of said body serving to open said first limit switch to de-energize said first relay and actuate said electrical means to start said time measuring device, further movement of said body serving to open said second limit switch to de-energize said second relay and actuate said electrical means to stop said time measuring device thereby indicating the time required for said body to move from said first limit switch to said second limit switch.

4. A speed indicating apparatus for a moving body, said apparatus comprising an elapsed time measuring device, electrical means for starting and stopping said time measuring device, a relay having an actuating coil, a second relay having an actuating coil, a push button starting switch, a two position selector switch, a limit switch having a set of normally closed contacts, a second limit switch having a set of normally closed contacts, said second switch being spaced a predetermined distance from said first limit switch and means attachable to said moving body to open said limit switches in succession, an electrical energy supply line and conductors interconnecting said electrical means, said first and second relays, said selector switch, said first and second limit switches and said supply line whereby with said selector swtich in one position and said body moving in a direction from said first to said second limit switches upon actuating said push button switch the coils of said first and second relays will be energized, movement of said body serving to open said first limit switch to de-energize said first relay and actuate said electrical means to start said time measuring device, further movement of said body serving to open said second limit switch to de-energize said second relay and actuate said electrical means to stop said time measuring device thereby indicating the time required for said body to move from said first limit switch to said second limit switch.

References Cited in the file of this patent
UNITED STATES PATENTS

| | | |
|---|---|---|
| 2,045,414 | Rumpel | June 23, 1936 |
| 2,635,692 | Scheske | Apr. 21, 1953 |